No. 793,860. PATENTED JULY 4, 1905.
H. TSCHERNING.
MOLDING MACHINE.
APPLICATION FILED SEPT. 5, 1903.
8 SHEETS—SHEET 1.
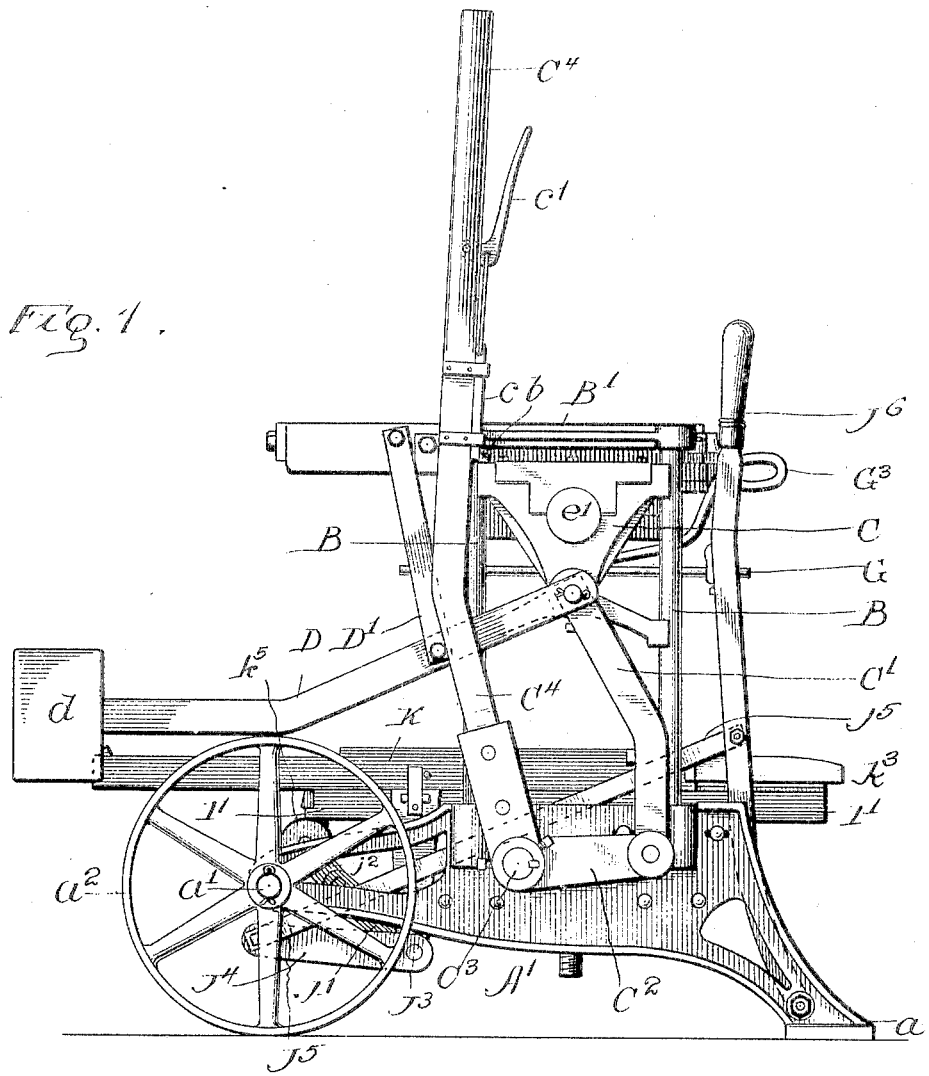

No. 793,860. PATENTED JULY 4, 1905.
H. TSCHERNING.
MOLDING MACHINE.
APPLICATION FILED SEPT. 5, 1903.
8 SHEETS—SHEET 2.
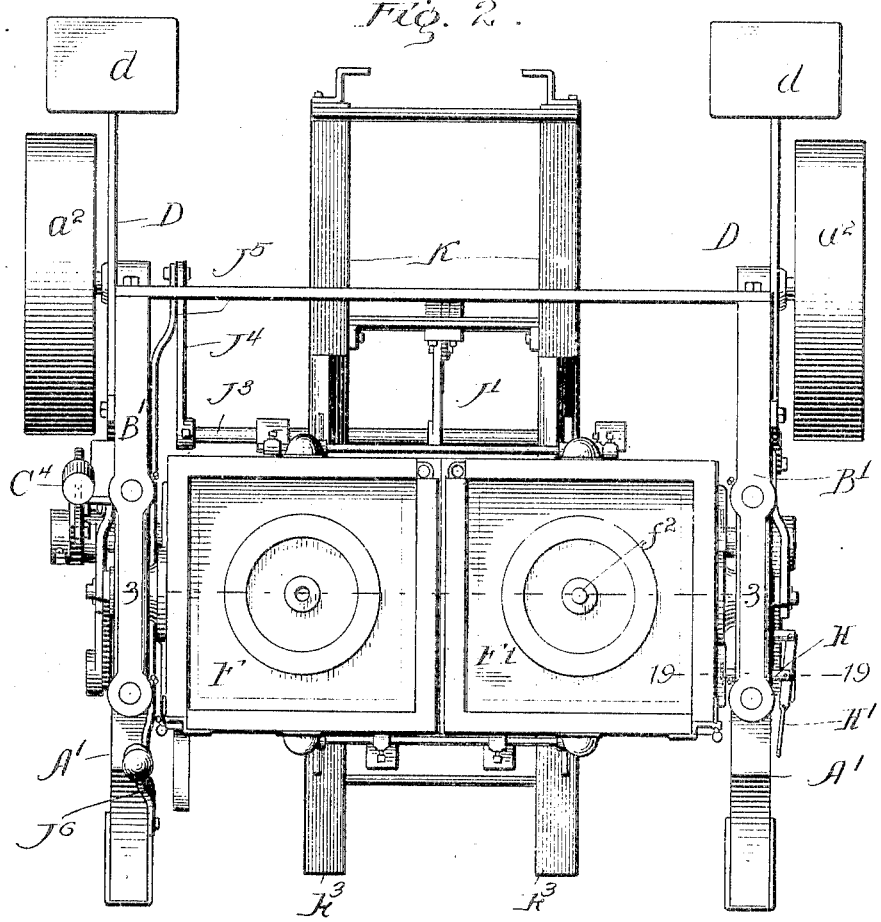
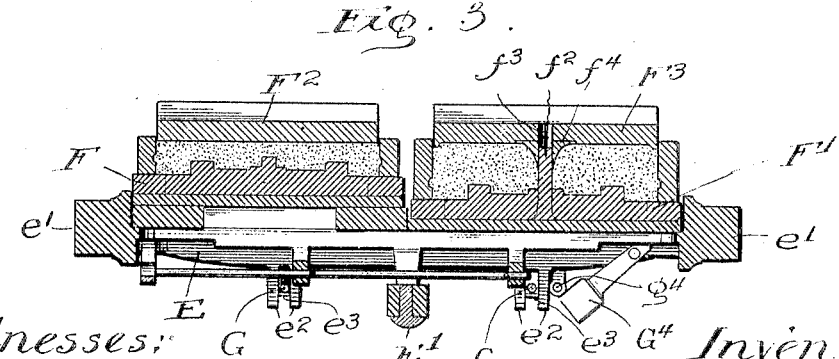

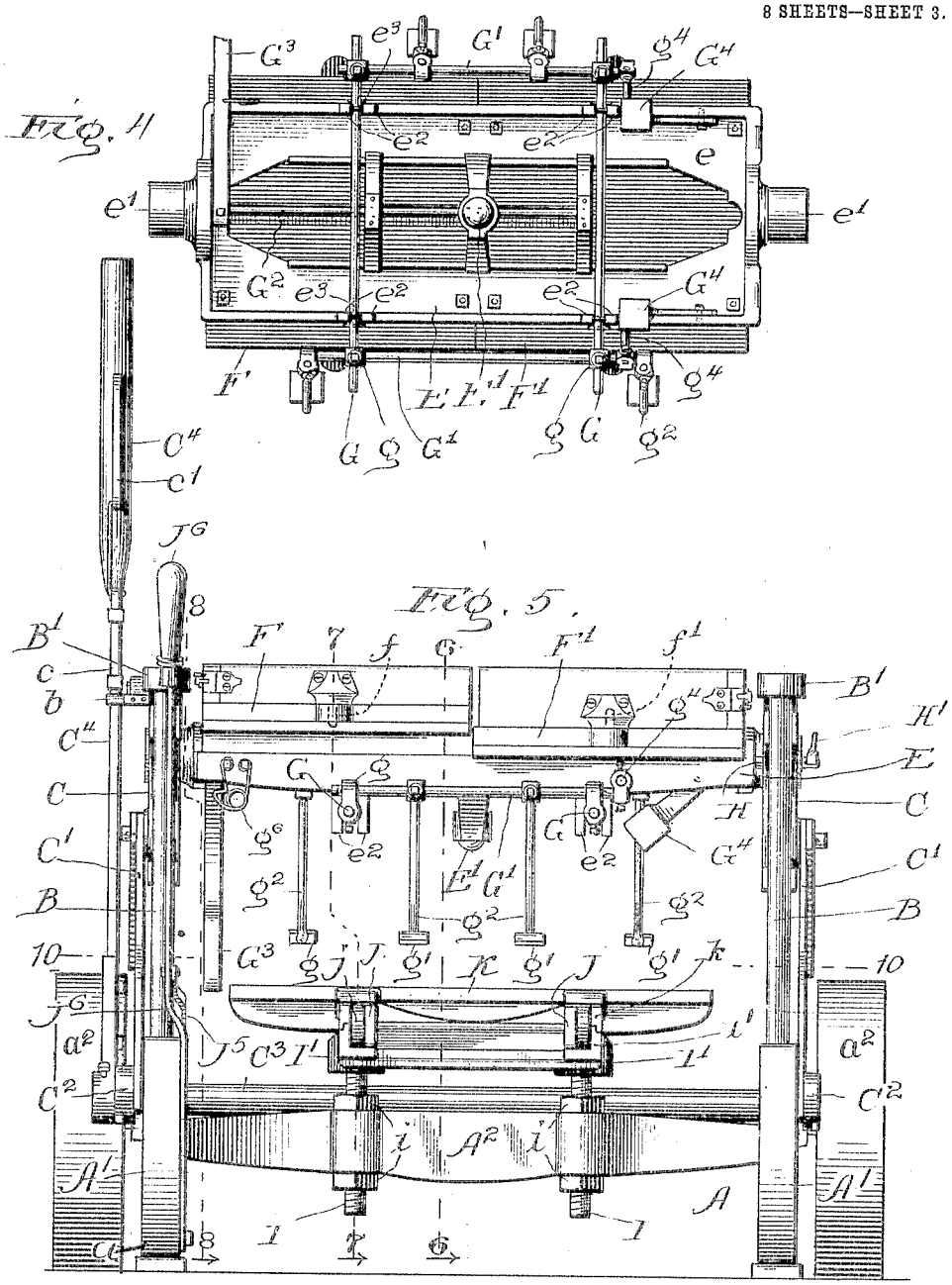

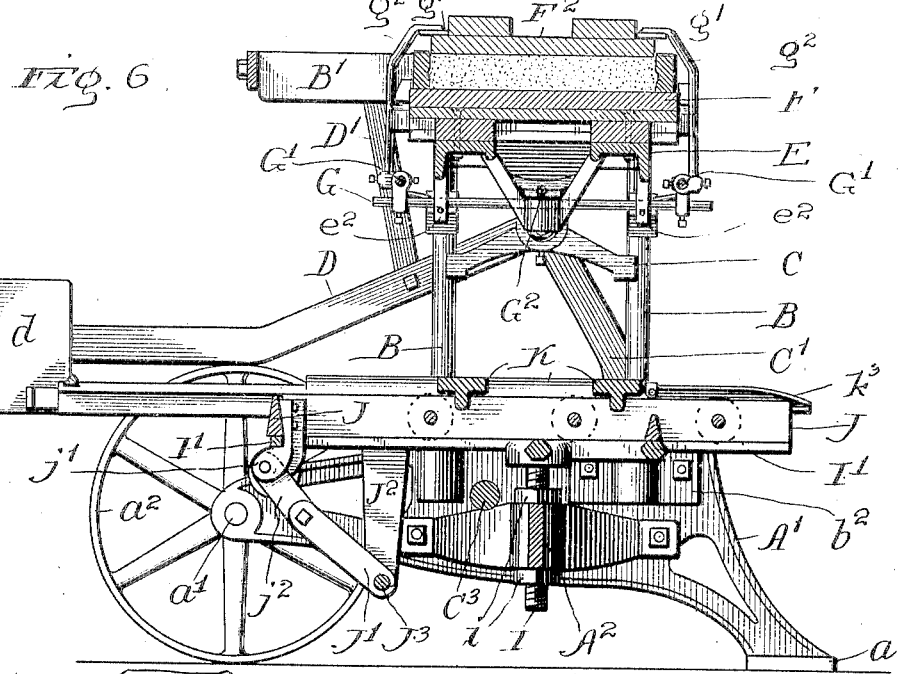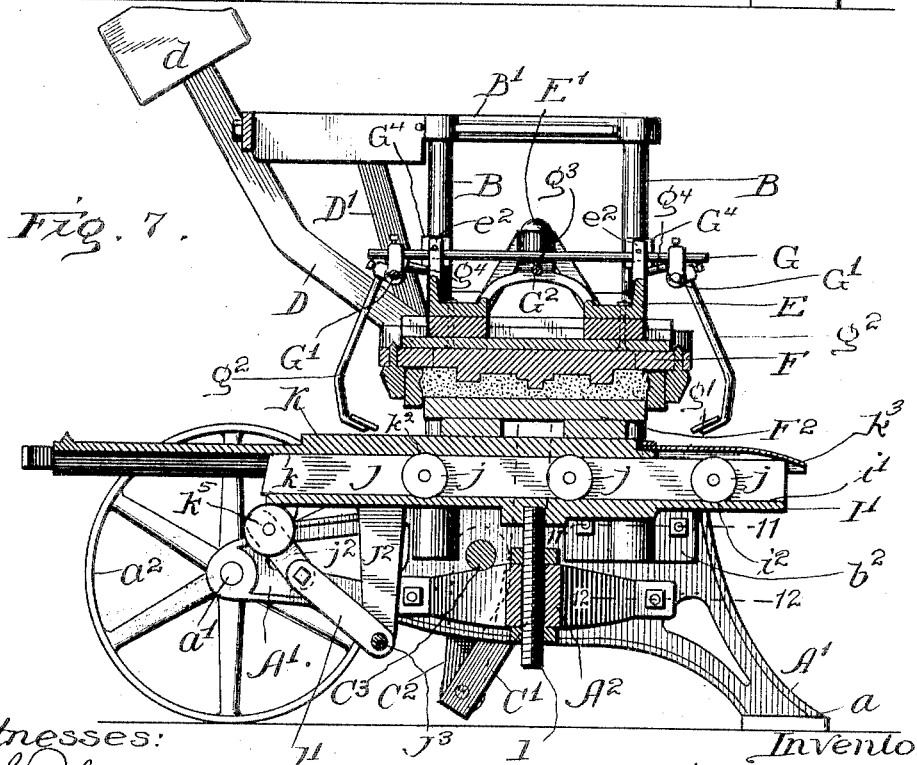

No. 793,860. PATENTED JULY 4, 1905.
H. TSCHERNING.
MOLDING MACHINE.
APPLICATION FILED SEPT. 5, 1903.

8 SHEETS—SHEET 5.

Witnesses:
S. Bliss.
Russell Wiley

Inventor:
Henry Tscherning.
by H Bittner
Atty.

No. 793,860. PATENTED JULY 4, 1905.
H. TSCHERNING.
MOLDING MACHINE.
APPLICATION FILED SEPT. 5, 1903.

8 SHEETS—SHEET 6.

Witnesses:
S. Bliss.
Russell Wiles

Inventor,
Henry Tscherning.
by H. Bitner
Atty.

No. 793,860. PATENTED JULY 4, 1905.
H. TSCHERNING.
MOLDING MACHINE.
APPLICATION FILED SEPT. 5, 1903.
8 SHEETS—SHEET 7.
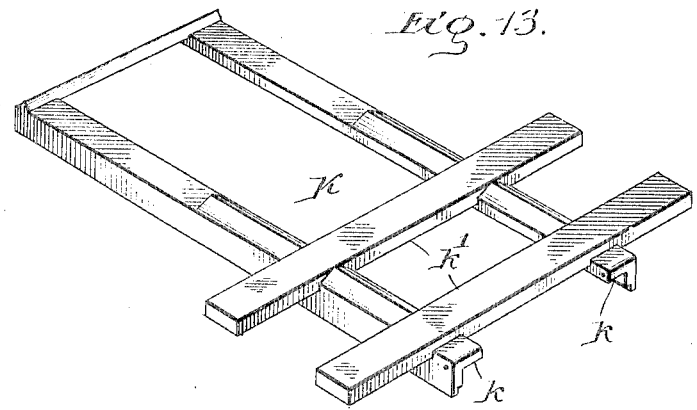
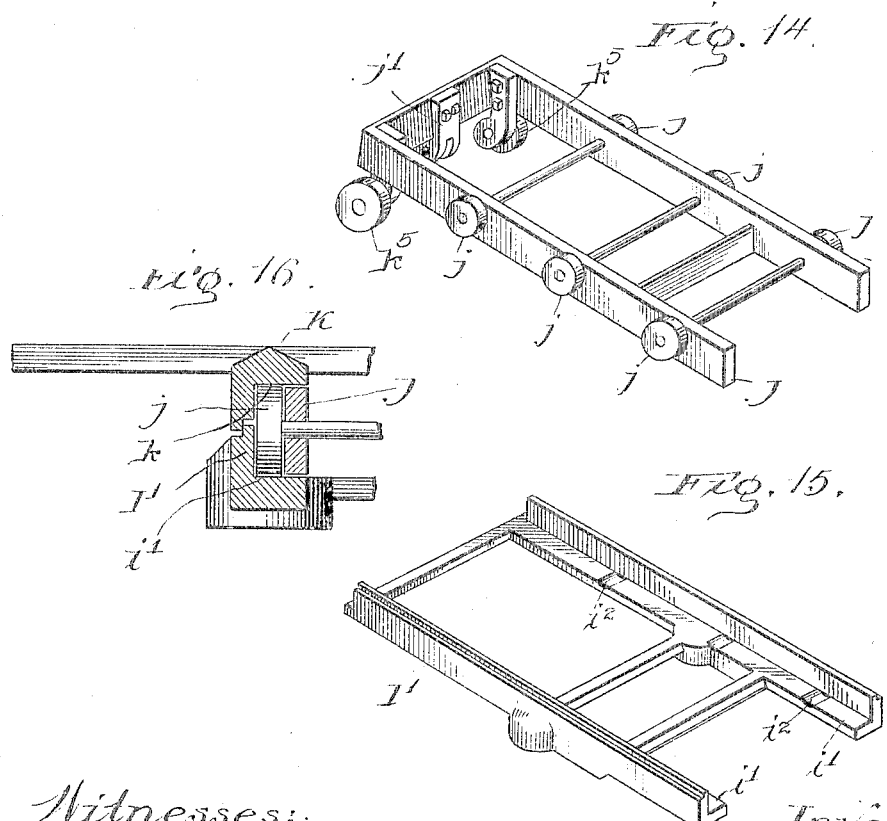

No. 793,860. PATENTED JULY 4, 1905.
H. TSCHERNING.
MOLDING MACHINE.
APPLICATION FILED SEPT. 5, 1903.
8 SHEETS—SHEET 8.
Fig. 17.
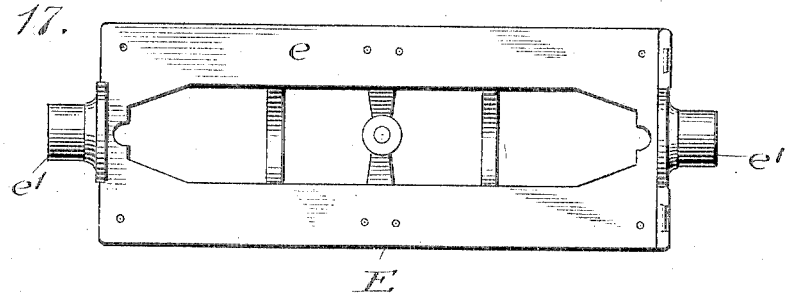
Fig. 18.
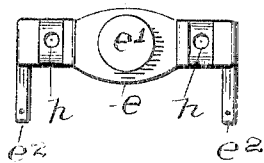
Fig. 19.
Fig. 20.
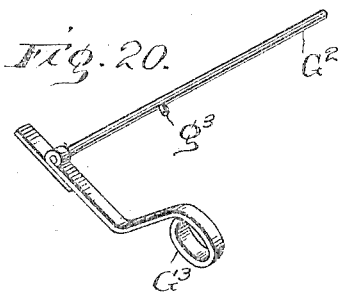
Fig. 21.
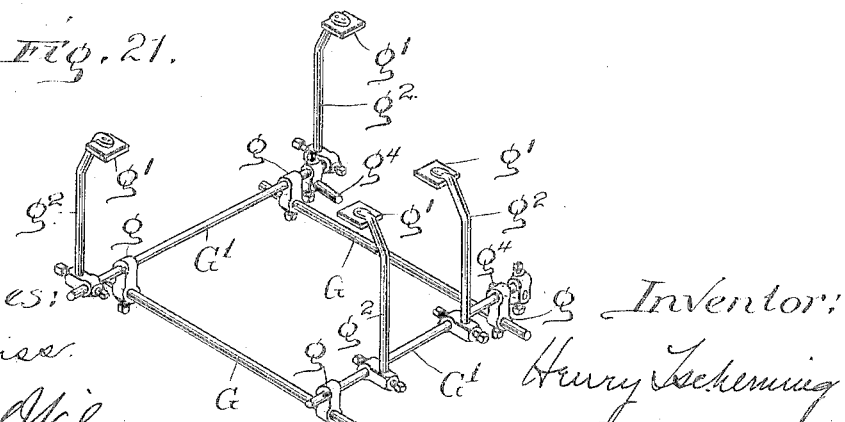
Witnesses:
S. Bliss.
Russell Wiles
Inventor:
Henry Tscherning
by H Bitner
Atty.

No. 793,860.

Patented July 4, 1905.

UNITED STATES PATENT OFFICE.

HENRY TSCHERNING, OF FREEPORT, ILLINOIS, ASSIGNOR TO ARCADE MANUFACTURING COMPANY, OF FREEPORT, ILLINOIS, A CORPORATION OF ILLINOIS.

MOLDING-MACHINE.

SPECIFICATION forming part of Letters Patent No. 793,860, dated July 4, 1905.

Application filed September 5, 1903. Serial No. 172,099.

*To all whom it may concern:*

Be it known that I, HENRY TSCHERNING, a citizen of the United States of America, residing at Freeport, in the county of Stephenson and State of Illinois, have invented certain new and useful Improvements in Molding-Machines, of which the following is a specification.

My invention relates to certain new and useful improvements in molding-machines. Its object is to produce a device of this class which shall operate successfully and which shall be easy to manipulate and quick in operation.

To these ends my invention consists in certain novel features of operation and construction, which will be clearly shown in the accompanying drawings and described in this specification.

Figure 8:
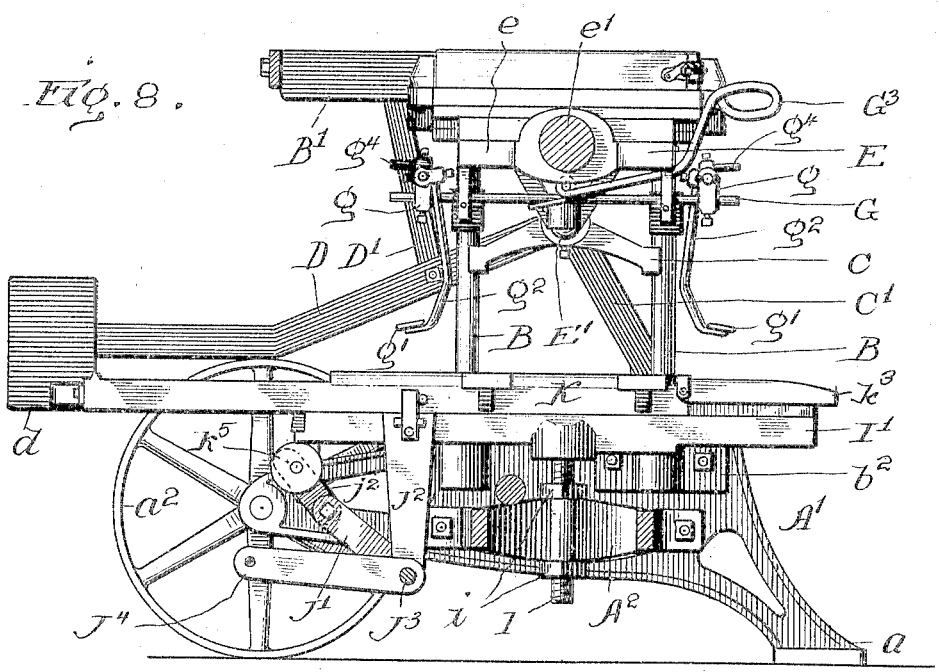
Figure 9:
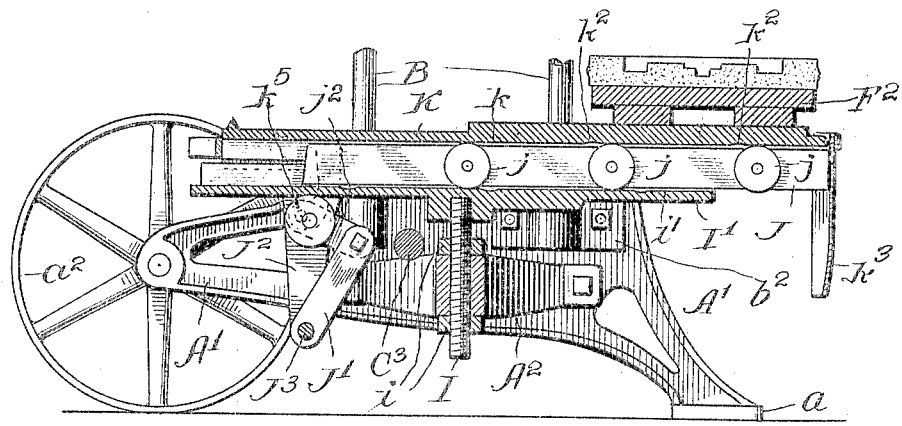
Figure 10:
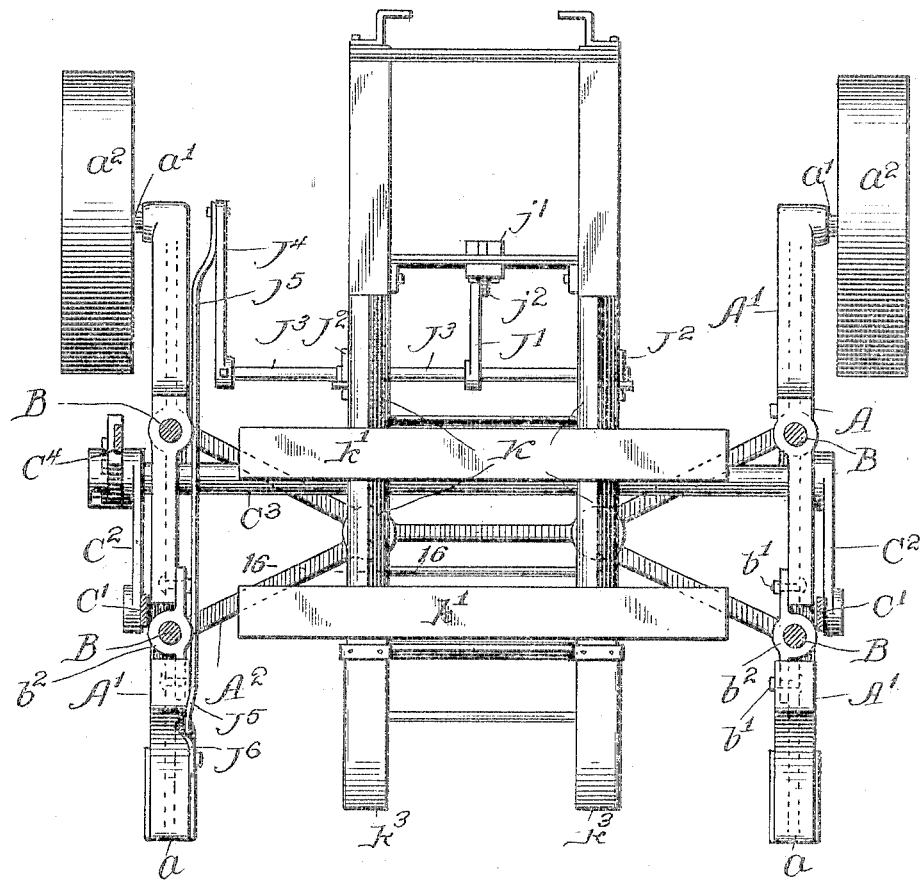
Figure 11:
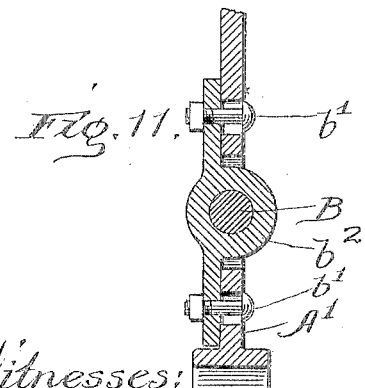
Figure 12:
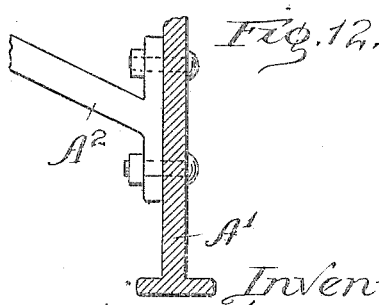

In the drawings, Figure 1 is a side view of the complete machine, the operating parts being in their normal position—that is, the two halves of the flask having been placed upon the match-plate. Fig. 2 is a plan view thereof. Fig. 3 is a vertical cross-section through the head, showing the flasks filled with sand, the cope and bottom boards having been placed thereon, the line of section being indicated in line 3 3 of Fig. 2. Fig. 4 is a plan view of the head as it appears when inverted. Fig. 5 is a front view of the machine. Fig. 6 is a vertical cross-section taken in the line 6 6 of Fig. 5, the flasks having been filled with sand and the cope and bottom boards put in place and clamped thereon. Fig. 7 is a vertical cross-section in the line 7 7 of Fig. 5, but showing the parts in the position in which the sand has been compressed. Fig. 8 is a vertical cross-section taken in the line 8 8 of Fig. 5. Fig. 9 is a section of the lower portion of the machine, similar to Fig. 7, but showing the platform moved out. Fig. 10 is a view, partly in plan and partly in horizontal section, the line of section being indicated in line 10 10 of Fig. 5. Fig. 11 is a detail horizontal section taken in the line 11 11 of Fig. 7. Fig. 12 is a similar section in the line 12 12 of Fig. 7. Fig. 13 is a perspective view of the platform. Fig. 14 is a similar view of a carriage used to move said platform. Fig. 15 is a similar view of a frame which supports said carriage and platform. Fig. 16 is a detail vertical section through one of the tracks of the platform, carriage, and frame in the line 16 16 of Fig. 10. Fig. 17 is a plan view of the head-casting. Fig. 18 is an end view thereof. Fig. 19 is a detail vertical cross-section of a latch for securing the head in certain positions, the line of section being indicated in line 19 19 of Fig. 2. Fig. 20 is a perspective view of a lever adapted to lock the clamping device on the cope and bottom boards, and Fig. 21 is a perspective view of said clamping device and its supporting members.

Referring to the drawings, A is a suitable base, composed of two side pieces A' and a transverse bar $A^2$. The side pieces A' terminate at their forward ends in legs $a$ and are supported at their rear ends by wheels $a^2$, mounted on short shafts $a'$. This structure is such that the machine is normally seated upon two legs and two wheels, so that it is comparatively firm in position; but when it is desirable to move it from place to place it can be wheeled around by lifting the legs from the ground. Four vertical rods B extend upward from the base A, two of the rods being supported upon each side piece. The upper ends of these rods are braced and spaced apart by bars B', one situated upon each side of the machine. Between each pair of rods is guided a cross-head C, each of the cross-heads C being vertically reciprocable. To each of the cross-heads is pivotally secured a link C', the opposite end of which is pivoted to an arm $C^2$, the two arms $C^2$ being rigidly secured to the opposite end of a rock-shaft $C^3$, journaled in the base of the machine. To one end of the shaft $C^3$ is secured a hand-lever $C^4$, by which the shaft can be rocked. When this lever is swung forward from the position shown in Fig. 1, it will be evident that the cross-heads will be drawn down the rods B toward the base of the machine, and as the lever is returned to the position shown in Fig. 1 the cross-heads will be moved back to their original position. A catch $c$, operated by a small lever $c'$, secured to the hand-lever $C^4$, is provided, wherewith the lever can be locked in the position shown in Fig. 1, the catch engaging a lug $b$ upon the bar B'. To each of the cross-heads adjacent to the point of connection of the links C' is pivoted an arm D, bearing at the end a weight $d$. Each arm D is supported midway its length by a link D', which hangs from the bars B', supported by the upper ends of the rods B. The purpose of this weight is to counterbalance the weight of the cross-heads and the weight of the parts carried thereby, which will presently be described, the weight moving upward as the cross-heads are lowered from the position shown in Fig. 6 to the position shown in Fig. 7.

It is to be observed that the front rods B are movable backward and forward upon the machine to a certain extent at their lower ends, the lower ends being mounted for the purpose in boxes $b^2$, Fig. 11, the boxes being secured to the base of the machine by bolts $b'$, running in slots provided in the base. The purpose of this adjustment is to permit the rods B to be moved and kept in close adjustment, as the cross heads and rods which guide them become worn from use. No adjustment is provided at the upper end of the rods, and none is necessary, as it is not particularly material whether there is a slight looseness when the cross-head is in its upper position or not; but it is very desirable that a guide be provided near the bottom of the movement of the cross-head.

In the two cross-heads is journaled a head E. (Shown in plan in Fig. 17.) The head consists of an open rectangular frame $e$, having gudgeons $e'$ at its opposite ends, said gudgeons being journaled in the cross-heads. To the upper side of this frame are secured two match-plates F F', Figs. 2 and 3, each of which bears upon it in relief one-half of the pattern which is to form the completed mold. The plate F forms the mold in the drag, and the plate F' forms the mold in the cope. The plate F is provided with holes $f$, and the plate F' is provided with pins $f'$, (see dotted lines, Fig. 5,) which are adapted to engage with the corresponding pins upon the drag and perforations in the cope. In the use of the machine the two flasks are placed upon the corresponding match-plates, with the parts in the position shown in Fig. 5. The flasks are then shoveled full of sand and leveled in at the top. Boards $F^2$ $F^3$, Fig. 3, are placed upon the sand in the flasks and clamped in place by mechanism which will presently be described. It is to be noted that the pattern upon the match-plate F' is provided with a pin $f^2$, adapted to form the sprue-hole in the sand, and the board $F^3$, which covers the flask upon this match-plate, is provided with a corresponding perforation $f^3$ and with a conical bead $f^4$, surrounding the perforation. By this means a sprue-hole with the proper tapered opening is provided in the mold, through which the molten metal is poured.

On the lower side of the frame $e$ of the head E are downwardly-projecting slotted ears $e^2$, Fig. 3, through which extend rods G. Pins $e^3$ limit the downward movement of the rods G in the slots of the ears $e^2$. At the ends of the rods G are secured bearing-blocks $g$, Fig. 4, in which are hinged two rods G', to which are clamped arms $g^2$, Fig. 21, bearing at their ends flat blades $g'$, thus forming clamping-hooks. These arms $g^2$ can be swung up by hand from the position shown in Fig. 5 to that shown in Fig. 6, wherein the blades $g'$ lie above the upper edges of the boards $F^2$ $F^3$ and tend to hold the same in place. A shaft $G^2$, Fig. 4, is journaled in the lower side of the frame $e$ and is provided at one end with a handle $G^3$, Fig. 8. A pin $g^3$, Fig. 20, projecting rigidly from this shaft, engages with one of the rods G and forces it down so as to bring the blades $g'$ into close clamping contact with the boards. A spring-catch $g^6$, (see Fig. 5,) secured to the frame $e$, is adapted to hold the handle $G^3$ up. The pin $g^3$ as the shaft $G^2$ is rotated eventually comes into a position at right angles to the rods G, and consequently locks itself in position. When this position has been reached, a spring-pressed pin H, (see Figs. 2 and 19,) mounted upon one of the cross-heads C, is withdrawn by means of a lever H' from its engagement with a perforation $h$ in the end of the head E, and the head is then completely inverted upon its bearings in the cross-head, the pin H falling back into another hole provided upon the opposite side of the gudgeon, the head being thereby locked in a horizontal position. The weight of the sand and flasks lying upon the blades $g'$ holds them firmly in position, although their normal tendency is to swing out to the position shown in Fig. 7 after the frame is inverted. This tendency is caused by the engagement of weights $G^4$, Figs. 4 and 7, mounted upon arms suitably pivoted upon the frame E, with projecting pins $g^4$ upon the hinged rods G'. These weights fall into engagement with the pins when the head is inverted, but are out of engagement therewith when it is in the position occupied when the flasks are being filled. In this way a yielding pressure tending to unclamp the flasks is provided, operating only when the head is in an inverted position and when the weight of the flasks and their contents is sufficient to keep the parts in place. The head having been inverted, the lever $C^4$ is swung forward, drawing the head from the position shown in Fig. 6 to that shown in Fig. 7 and bringing the boards $F^2$ $F^3$ in contact with a movable table provided to receive it. These boards are crowded into the flasks by the downward movement of the head, and the sand is compressed upon the match-plates, forming a perfect mold. When the weight of the flasks and their contents is removed from the blades $g'$ and transferred to the movable table, these blades swing out under the influence of the weights $G^4$, above described, thus releasing all the parts. After the compression is completed a projecting knob $E'$ upon the lower side of the frame (the upper side in the position shown in Fig. 7) is tapped lightly to jar the patterns a little, and the lever $C^4$ is swung back to its original position, raising the head and match-plates and leaving in place the two molds. The platform upon which the flasks rest is then moved forward to bring the flasks into a convenient position, after which the cope is inverted by hand and placed upon the drag and the upper board $F^3$ thereof removed. This leaves the completed mold.

The moving platform upon which the flasks come to rest and means for operating it will now be described.

The transverse bar $A^2$, Fig. 5, which connects the two side pieces of the base of the machine, is perforated to receive two vertical screws $I$, which are vertically movable and are provided with lock-nuts $i$ above and below the cross-bar $A^2$, by which they can be fixed in any desired position. Secured to the tops of these screws is a rectangular frame $I'$, (see Fig. 15,) having at its sides tracks $i'$, the said tracks being connected by suitable transverse members, preferably integral therewith. Upon the tracks $i'$ is supported a carriage $J$, (see Fig. 14,) made in the form of a rectangular frame and provided at the sides with rollers $j$, running upon the tracks $i'$. At the rear of the carriage $J$ is an ear $j'$, which is connected by a link $j^2$, Fig. 6, to an arm $J'$, rigidly secured to a rock-shaft $J^3$, which is journaled in two arms $J^2$, secured to the rectangular frame $I'$. To one end of this shaft is rigidly secured an arm $J^4$, Figs. 1 and 8, which is connected by a link $J^5$ with a hand-lever $J^6$ at the front of the machine and pivoted to one of the legs $a$. It is evident that pulling this lever forward will rotate the shaft $J^3$, and consequently draw the carriage $J$ forward by pull exerted through the arm $J'$ and link $j^2$. Upon the top of the carriage $J$ is a platform $K$, (see Fig. 13,) composed of inverted tracks $k$ and suitable cross-pieces $k'$, upon which the boards which are placed upon the flasks may come to rest. It is evident that as the carriage $J$ is moved forward, as heretofore described, the platform $K$ will move forward at double the speed, inasmuch as the tracks $k$ run upon the upper surfaces of the rollers $j$, while the same rollers in turn run upon the stationary tracks $i'$. The tracks $i'$ and $k$ are provided, it will be noted, with notches $i^2 k^2$, (see Figs. 7 and 9, respectively,) into which the rollers fall when the carriage is in its rear position, so that when so positioned the tracks $k$ rest directly upon the tracks $i'$, the rollers having no sustaining effect. When the carriage moves forward, however, the rollers leave the notches and sustain the weight of the carriage and platform $K$. It is desirable that the weight be removed from the rollers at the time when the compression of the sand in the molds is taking place, and consequently this device is provided for the purpose. The platform $K$ is extended to the end of the carriage $J$ and frame $I'$ by two plates $k^3$, hinged to the tracks $k$, Figs. 6 to 10. When the platform is moved out, the plates swing down out of the way, Fig. 9. Two rollers $k^5$, Fig. 14, are secured to the carriage $J$ by means of suitable downwardly-projecting brackets, these rollers running upon the under side of the tracks $i'$ of the frame $I'$ and serving to prevent any tilting of the platform when moved out and supporting the molds.

The operation of the entire structure should now be readily apparent. Starting in the position shown in Fig. 1, the flasks are placed upon the match plates, filled with sand, and covered with the proper boards. The clamping-blades are then swung up over the edges of the boards and locked in place by swinging down the lever $G^3$. The head is then released by pulling the locking-pin $H$ out of place, inverted, and locked in its inverted position.

The compression-lever $C^4$ is then pulled forward, drawing down the head and driving the boards into the flask, thus releasing the clamping-blades, which swing away from the boards. The sand in the mold is then slightly jarred, as above described, and the head is raised by moving back the compression-lever. The platform upon which the boards stand is then moved forward by pulling forward the hand-lever $J^6$. The cope is inverted and placed upon the drag, the top board is taken off, and the completed mold removed. The table is then returned to its original position and the machine is ready for another operation.

I realize that considerable variation is possible in the details of this construction without departing from the spirit of the invention, and I therefore do not intend to limit myself to the specific form herein shown and described.

I claim as new and desire to secure by Letters Patent—

1. In a device of the class described, the combination with a suitable base, a horizontally-movable platform supported thereon to receive the flasks and an operating-lever having connection with the platform to move the same forward, of vertical guides extending upward on each side of the base, a cross-head carried by each of the guides, a head journaled between the cross-heads, a pattern-plate secured to the head, clamps constructed and arranged to secure a portion of the flask to the head, means for bringing the flask, when secured to the plate, into forcible contact with the platform, said clamps being constructed and arranged to release the flask automatically when brought into such contact.

2. In a device of the class described, the combination with a base having a suitable platform thereon, a vertically-guided, reciprocable and rotatable head having a pattern upon one side, and means for reciprocating the same, of a plurality of arms hinged to the head, blades upon the ends of the arms adapted to swing over the edges of a bottom board and hold one part of a flask, its contents, and a bottom board in place upon the head, and means for clamping the blades against the bottom board.

3. In a device of the class described, the combination with a base having a suitable platform thereon, a vertically-guided, reciprocable and rotatable head having a pattern upon one side, and means for reciprocating the same, of transversely-movable rods secured to the head, arms hinged to the rods, blades upon the ends of the arms adapted to swing over the edges of a bottom board and hold one part of a flask, its contents, and a bottom board in place, and a rock-shaft journaled upon the head and having a pin adapted to come in contact with one of the transversely-movable rods to clamp the blades against the bottom board.

4. In a device of the class described, the combination with a base having a suitable platform thereon, a vertically-guided, reciprocable and rotatable head having a pattern upon one side, and means for reciprocating the same, of transversely-movable rods secured to the head, arms hinged to the rods, blades upon the ends of the arms adapted to swing over the edges of a bottom board and hold one part of a flask, its contents, and a bottom board in place, and means for moving the transversely-movable rods to clamp the blades against the bottom board.

5. In a device of the class described, the combination with a base having a suitable platform thereon, a vertically-guided reciprocable and rotatable head having a pattern upon one side, and means for reciprocating the same, of arms hinged to the head, blades upon the ends of the arms adapted to swing over the edges of a bottom board and hold one part of a flask, its contents, and a bottom board in place, and a device for exerting yielding pressure upon said arms to swing them away from the head only when the side thereof bearing the pattern is downward.

6. In a device of the class described, the combination with a base having a suitable platform thereon, a vertically-guided, reciprocable and rotatable head having a pattern upon one side, and means for reciprocating the same, of rods hinged to the head on the opposite side from the pattern, arms rigidly secured to the rods, blades upon the ends of said arms adapted to swing over the edges of a bottom board and hold one part of a flask, its contents, and the bottom board in place upon the head, a pin upon each of said hinged rods and weights adapted to swing against said pins when the head is turned with the pattern side down, the weights tending to swing the arms away from the bottom board.

7. In a device of the class described, the combination with a suitable base, a vertically-reciprocable head, and means for reciprocating the same, of tracks situated upon the base of the machine, a carriage upon the tracks, a lever connected with the carriage and adapted to move the same forward and back upon the tracks, and a platform rolling upon the rollers of said carriage, whereby the platform is moved simultaneously with and at a greater speed than the carriage.

8. In a device of the class described, the combination with a suitable base, a vertically-reciprocable head, and means for reciprocating the same, of suitable tracks upon the base of the machine, a carriage running upon the tracks, means for reciprocating the carriage upon the tracks, and a platform running upon the rollers of the carriage when the carriage is in any but the rearmost position, and when the carriage is in its rearmost position resting upon the tracks.

9. In a device of the class described, the combination with a suitable base, a vertically-reciprocable head, and means for reciprocating the same, of tracks provided with suitable notches, a carriage provided with suitable rollers resting in the notches when the carriage is in its rearmost position, means for reciprocating the carriage, a platform provided with tracks running upon the rollers of the carriage when the rollers thereof are not in the notches, and resting on the tracks upon the base when the rollers are in the notches.

In witness whereof I have signed the above application for Letters Patent, at Freeport, in the county of Stephenson and State of Illinois, this 26th day of August, A. D. 1903.

HENRY TSCHERNING.

Witnesses:
F. E. BOEDEKER,
B. C. HERBIG.